United States Patent
Fujishima et al.

(10) Patent No.: US 6,757,581 B2
(45) Date of Patent: Jun. 29, 2004

(54) OFFSET APPARATUS FOR NC MACHINE TOOL

(75) Inventors: Makoto Fujishima, Yamatokoriyama (JP); Yoshiaki Akamatsu, Yamatokoriyama (JP)

(73) Assignees: Mori Seiki Co., Ltd., Yamatokoriyama (JP); Intelligent Manufacturing Systems International, Sacramento, CA (US)

( * ) Notice: Subject to any disclaimer, the term of this patent is extended or adjusted under 35 U.S.C. 154(b) by 0 days.

(21) Appl. No.: 10/260,567

(22) Filed: Oct. 1, 2002

(65) Prior Publication Data

US 2003/0065419 A1 Apr. 3, 2003

(30) Foreign Application Priority Data

Oct. 2, 2001 (JP) ......................... 2001-306347

(51) Int. Cl.$^7$ .............................................. G06F 19/00
(52) U.S. Cl. ................... 700/176; 700/183; 318/568.11
(58) Field of Search ................................. 700/169, 175, 700/176, 183, 185, 193, 159; 451/1, 11, 5; 318/568.11, 567, 569; 702/182–186; 72/12.4, 14.7, 19.3

(56) References Cited

U.S. PATENT DOCUMENTS 5,708,586 A * 1/1998 Ikeda ........................ 700/186
5,919,380 A * 7/1999 Magara et al. ........... 219/69.16
6,314,336 B1 * 11/2001 Sugiyama et al. ......... 700/174
6,415,191 B1 * 7/2002 Pryor .......................... 700/95

OTHER PUBLICATIONS

Patent Abstracts of Japan Publication No. 5–285784 dated Nov. 2, 1993.
Patent Abstracts of Japan Publication No. 6–182654 dated Jul. 5, 1994.
Patent Abstracts of Japan Publication No. 7–075937 dated Mar. 20, 1995.
Patent Abstracts of Japan Publication No. 8–215983 dated Aug. 27, 1996.
Patent Abstracts of Japan Publication No. 10–296586 dated Nov. 10, 1998.

* cited by examiner

*Primary Examiner*—Leo Picard
*Assistant Examiner*—Kidest Bahta
(74) *Attorney, Agent, or Firm*—Westerman, Hattori, Daniels & Adrian, LLP

(57) ABSTRACT

The present invention relates to an offset apparatus for an NC machine tool, that can achieve high accuracy machining by offsetting the amount of operation of a motion mechanism in accordance with the analysis result of the behavior of the NC machine tool. The offset apparatus 1 comprises: a model analyzing data base 12 in which three dimensional model data of the motion mechanism 2 and condition data for performance analysis are stored; a model analyzing section 13 which analyzes the performance of the motion mechanism 2; a data accumulating section 14 which stores analyzed performance analysis data; an offset amount computing section 15 which computes an offset amount to be applied to a commanded operation amount on the basis of the performance analysis data; and an offset executing section 17 which offsets the amount of operation of the motion mechanism 2 on the basis of the offset amount.

3 Claims, 4 Drawing Sheets

F I G. 1
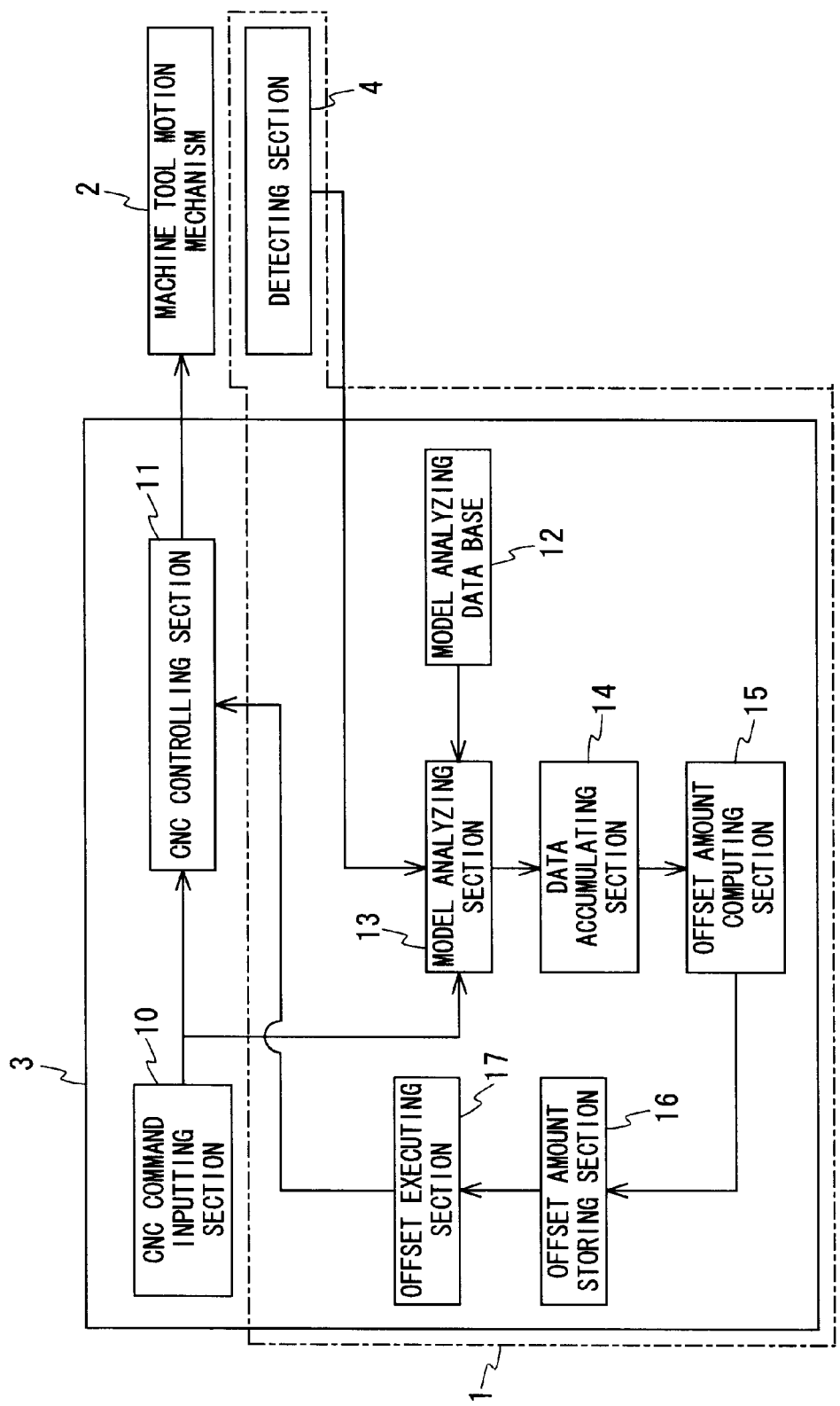

FIG. 4

| PART | PERFORMANCE | RESULT OF ANALYSIS |
|---|---|---|
| SPINDLE | THERMAL DEFORMATION AMOUNT OF SPINDLE IN Z-AXIS DIRECTION | 25 ($\mu$m) |
| | DEFORMATION AMOUNT OF SPINDLE IN Z-AXIS DIRECTION DUE TO MACHINING LOAD | 15 ($\mu$m) |
| FEED SYSTEM | THERMAL DEFORMATION AMOUNT OF X-AXIS BALL SCREW | 8 ($\mu$m) |
| | THERMAL DEFORMATION AMOUNT OF Y-AXIS BALL SCREW | 6 ($\mu$m) |
| | THERMAL DEFORMATION AMOUNT OF Z-AXIS BALL SCREW | 15 ($\mu$m) |
| STRUCTURE | THERMAL DEFORMATION AMOUNT OF BED | 20 ($\mu$m) |
| | DEFORMATION AMOUNT OF BED DUE TO MACHINING LOAD | 10 ($\mu$m) |
| | THERMAL DEFORMATION AMOUNT OF COLUMN | 25 ($\mu$m) |
| | DEFORMATION AMOUNT OF COLUMN DUE TO MACHINING LOAD | 15 ($\mu$m) |
| | THERMAL DEFORMATION AMOUNT OF TABLE | 8 ($\mu$m) |
| | DEFORMATION AMOUNT OF TABLE DUE TO MACHINING LOAD | 10 ($\mu$m) |
| | THERMAL DEFORMATION AMOUNT OF SPINDLE HEAD | 10 ($\mu$m) |
| | DEFORMATION AMOUNT OF SPINDLE HEAD DUE TO MACHINING LOAD | 10 ($\mu$m) |
| WORK | DEFORMATION AMOUNT OF WORK DUE TO MACHINING LOAD | 10 ($\mu$m) |
| NATURAL FREQUENCY OF MOTION MECHANISM | | ** (Hz) |
| FREQUENCY OF MACHINING | | ** (Hz) |

OFFSET APPARATUS FOR NC MACHINE TOOL

BACKGROUND OF THE INVENTION

1. Field of the Invention

The present invention relates to an offset apparatus for an NC machine tool, and more particularly to an offset apparatus for offsetting the amount of operation of a motion mechanism in accordance with the result of performance analysis of the NC machine tool.

2. Description of the Prior Art

Operation of an NC machine tool is controlled by a numerical controller provided for the NC machine tool. More specifically, the numerical controller sequentially analyzes an NC program and generates operation command signals for spindle motor, servo motor of feed system, etc. and, based on the thus generated operation command signals, the spindle motor, feed system servo motor, etc. are controlled for operation.

Here, the condition of the NC machine tool is not constant at all times but varies from moment to moment according to its operation condition. For example, the cutting edge of the tool wears due to machining, and the machining accuracy gradually degrades. Therefore, to ensure proper machining accuracy, it is commonly practiced to offset the amount of operation of the feed system servo motor by the amount of wear.

Further, the bearing for supporting the spindle generates heat during its rotation due to the friction between the rolling element and bearing ring, and the generated frictional heat is transmitted to the spindle, causing the temperature of the spindle to rise and deforming the spindle due to the thermal expansion caused by the temperature rise. As a result, the relative positional relationship between the tool and work changes, resulting in a machining error. In view of this, it is commonly practiced to measure the spindle temperature by a temperature sensor, estimate the amount of thermal deformation of the spindle from the measured spindle temperature and, based on the estimated amount of thermal deformation, offset the amount of operation of the feed system servo motor so as to compensate for the thermal deformation.

Likewise, the bearing for supporting the feed screw in the feed system also generates heat during its rotation due to the friction between the rolling element and bearing ring, and the generated frictional heat is transmitted to the feed screw, causing the temperature of the feed screw to rise and deforming the feed screw due to the thermal expansion caused by the temperature rise. As a result, the positioning accuracy of the feed system degrades, resulting in a machining error. In view of this, it is commonly practiced to detect the thermal deformation of the feed screw by a displacement sensor and, based on the detected amount of thermal deformation, offset the amount of operation of the feed system servo motor so as to compensate for the thermal deformation.

However, the heat generated at the above bearings is transmitted not only to the spindle and the feed screw but, via these parts, to the entire structure such as the bed, headstock, spindle head, saddle, and column that constitute the machine tool, and thus the entire structure suffers thermal deformation, causing the relative positional relationship between the tool and work to change and resulting in a machining error. Therefore, to achieve high accuracy machining, not only must offsets be applied for the deformations of the spindle and the feed screw caused by the temperature rise of the bearings, but the thermal deformation of the entire structure must also be analyzed so that offset appropriate to the thermal deformation can be applied. In the prior art, however, such advanced offset has not been performed.

Further, the machine tool generates vibrations during machining, and if the frequency is close to the natural frequency of the machine tool, the machine tool resonates, and the effects of the vibrations are transferred to the machined surfaces, degrading the machining accuracy and the quality of the machined surfaces. Accordingly, to achieve high accuracy, high quality machining, it is preferable that both the frequency during machining and the natural frequency of the machine tool be analyzed and the rotational speed and/or feed speed of the tool and work be offset so as to prevent the above frequencies from coming close to each other.

The present invention has been devised in view of the above situation, and it is an object of the invention to provide an offset apparatus for an NC machine tool, that can achieve high accuracy, high quality machining by analyzing the behavior of the NC machine tool (the performance of the machine tool motion mechanism) and by offsetting the amount of operation of the motion mechanism in accordance with the result of the analysis.

SUMMARY OF THE INVENTION

The present invention which achieves the above object concerns an NC machine tool offset apparatus that is provided for an NC machine tool equipped with a numerical controller for controlling operation of a motion mechanism in accordance with an operation command signal, and that offsets the amount of operation of the motion mechanism which is driven and controlled in accordance with the operation command signal, comprising:

analysis data storing means for storing three dimensional model data of the motion mechanism and condition data for performance analysis;

analyzing means for analyzing the performance of the motion mechanism, based on the operation command signal in the numerical controller and on the three dimensional model data of the motion mechanism and the condition data for performance analysis stored in the analysis data storing means;

data accumulating means for storing performance analysis data analyzed by the analyzing means;

offset amount computing means for computing, from the performance analysis data stored in the data accumulating means, the amount of offset to be applied to a commanded operation amount directed by the operation command signal; and offset executing means for offsetting the amount of operation of the motion mechanism, based on the amount of offset computed by the offset amount computing means.

The motion mechanism in the present invention collectively refers to the mechanisms constituting the machine tool excluding the controller, and includes: structures such as a bed, table, spindle, headstock or spindle head, saddle, and column; a feed mechanism comprising a feed screw, nut, feed motor, etc.; a spindle motor; and peripheral devices such as a tool changer and a pallet changer.

According to this offset apparatus, first the analyzing means analyzes the performance of the motion mechanism, based on the operation command signal in the numerical controller and on the three dimensional model data of the motion mechanism and the condition data for performance analysis stored in the analysis data storing means, and the analyzed performance analysis data is stored in the data accumulating means. Next, the offset amount computing means computes, from the performance analysis data stored in the data accumulating means, the amount of offset to be applied to the commanded operation amount directed by the operation command signal; then, based on the amount of offset computed by the offset amount computing means, the offset executing means offsets the amount of operation of the motion mechanism. Here, a technique such as a finite element method or boundary element method is used as the technique for analysis.

Examples of the performance of the motion mechanism include, besides the deformation of the motion mechanism due to load, the natural frequency of the motion mechanism itself and vibrations caused by machining, but the performance is not limited to these factors. Examples of the load include, besides the thermal load from a heat generating source such as a bearing and the machining load due to machining, a varying load the acting point of whose own weight varies due to the movement of a movable body such as a saddle, table, or column.

In this way, when offsetting for the deformation of the motion mechanism due to thermal load, for example, first the amount of heat generated by heat generating sources, such as the spindle supporting bearing and the feed screw supporting bearing, is computed by the analyzing means, based on the operation command signals for the spindle motor and the feed motor (signals relating to rotational speed) received from the numerical controller; then, based on the amount of generated heat thus computed and the data stored in the analysis data storing means, the amount of deformation of the entire motion mechanism is computed by the analyzing means by using the above analysis technique. Next, based on the amount of deformation thus computed, the amount of displacement, for example, in the relative positional relationship between the work and tool is computed by the offset amount computing means, and the amount of operation offset that compensates for the amount of displacement is computed for each feed mechanism. Then, the offset is executed by the offset executing means in accordance with the thus computed amount of offset.

Further, when offsetting for the deformation of the motion mechanism due to machining load, first the machining load is computed by the analyzing means, based on the operation command signals, etc. for the spindle motor and the feed motor (signals relating to spindle rotational speed, feed speed, or electric current value of each motor) received from the numerical controller; then, based on the machining load thus computed and the data stored in the analysis data storing means, the amount of deformation of the entire motion mechanism is computed by the analyzing means by using the above analysis technique. Next, based on the amount of deformation thus computed, the amount of deformation in the relative positional relationship between the work and tool is computed by the offset amount computing means, and the amount of operation offset that compensates for the amount of deformation is computed for each feed mechanism by the offset amount computing means. Then, the offset is executed by the offset executing means in accordance with the thus computed amount of offset.

On the other hand, when making an offset by analyzing the vibrations of the motion mechanism, first the analyzing means, based on the data stored in the analysis data storing means, analyzes the natural frequency of the motion mechanism by using the above analysis technique and, at the same time, analyzes the vibrations being caused by machining, based on the operation command signals for the spindle motor and the feed motor (signals relating to spindle rotational speed, feed speed, or electric current value of each motor) received from the numerical controller and on the data stored in the analysis data storing means. Then, the offset amount computing means compares the frequency due to machining with the natural frequency thus analyzed, and if the frequency due to machining is within a predetermined range relative to the natural frequency, the amount of offset (the amount of decrease or increase in speed) to be applied to the feed speed of the feed mechanism and/or the rotational speed of the spindle is computed. Then, the offset is executed by the offset executing means in accordance with the thus computed amount of offset.

In this way, according to the above offset apparatus, since the deformation of the entire motion mechanism caused by thermal load, machining load, etc. is analyzed, and the amount of operation of the feed mechanism is offset based on the amount of deformation thus analyzed, accurate offset can be achieved compared with the prior art. Such accurate offset contributes to further enhancing the accuracy of machining.

Furthermore, since the motion mechanism can be prevented from resonating due to machining vibrations by offsetting the feed speed of the feed mechanism and/or the rotational speed of the spindle, chattering vibrations can be prevented from occurring in the machining process, and the surface accuracy of machined surfaces can thus be enhanced.

BRIEF DESCRIPTION OF THE DRAWINGS

FIG. 1 is a block diagram schematically showing the configuration of an offset apparatus for an NC machine tool according to one embodiment of the present invention.

FIG. 4 is an explanatory diagram showing analysis result data stored in a data accumulating section according to the embodiment.

DESCRIPTION OF THE PREFERRED EMBODIMENT

Figure 2:
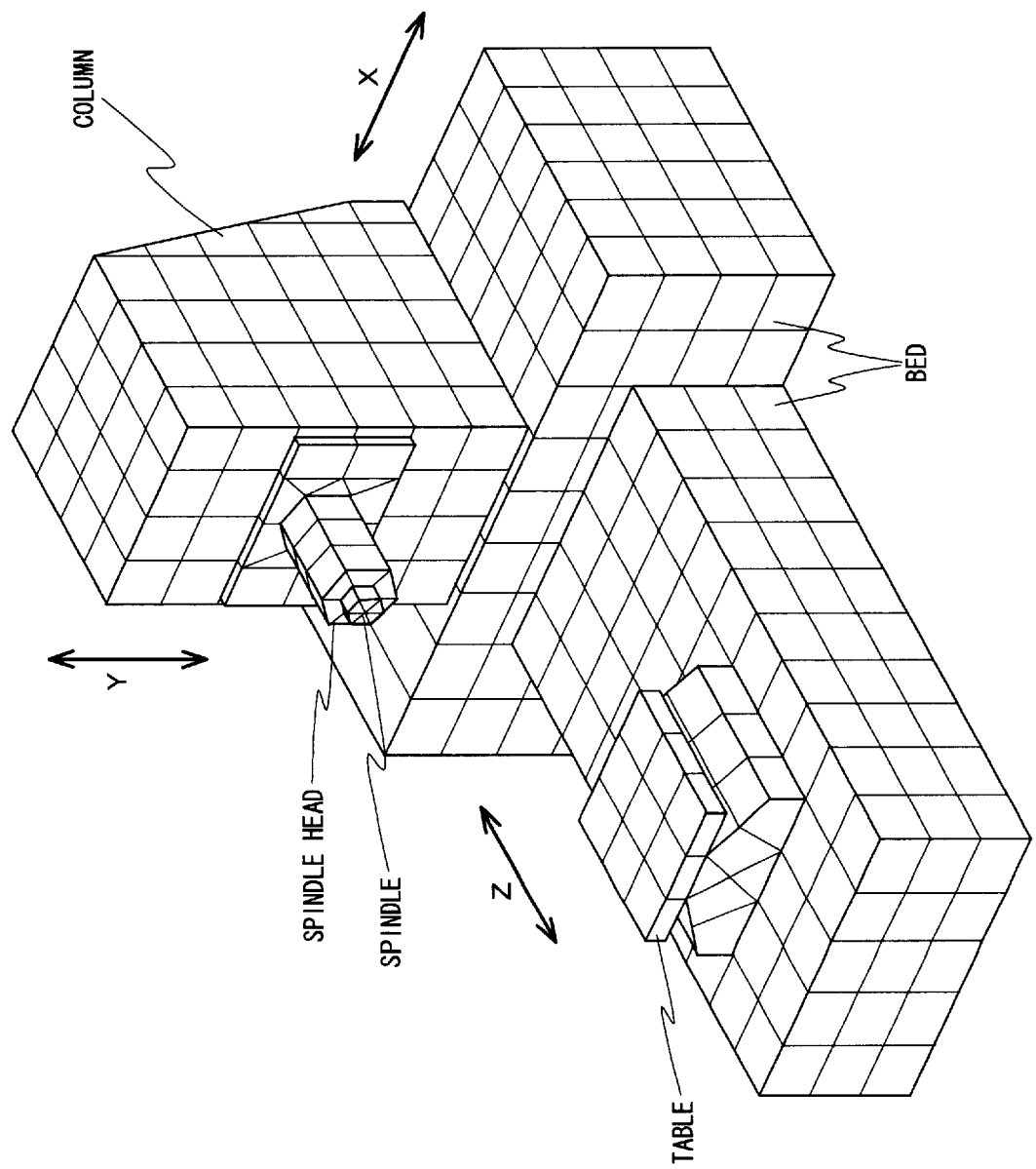
FIG. 2 is a perspective view showing three dimensional model data of a motion mechanism according to the embodiment.

The preferred embodiment of the present invention will be described below with reference to the accompanying drawings. FIG. 1 is a block diagram schematically showing the configuration of an offset apparatus for an NC machine tool according to one embodiment of the present invention.

As shown in FIG. 1, the offset apparatus 1 of this embodiment comprises various sections, such as a model analyzing data base 12, a model analyzing section 13, a data accumulating section 14, an offset amount computing section 15, an offset amount storing section 16, and an offset executing section 17, that are contained in a machine tool numerical controller 3, and a detecting section 4 disposed at a suitable position on a machine tool motion mechanism (hereinafter simply referred to as the "motion mechanism") 2. Besides the above-enumerated sections, a CNC command inputting section 10, a CNC controlling section 11, etc. are also contained in the numerical controller 3.

The CNC command inputting section 10, the CNC controlling section 11, the model analyzing data base 12, the model analyzing section 13, the data accumulating section 14, the offset amount computing section 15, the offset amount storing section 16, and the offset executing section 17 are each constructed from a CPU, ROM, RAM, hard disk, or the like. The detecting section 4 comprises a temperature sensor such as a thermistor, and detects the ambient temperature around the motion mechanism 2.

The motion mechanism 2 is a term that collectively refers to the mechanisms excluding the controller (which includes the numerical controller), and its constituent elements differ according to the type of machine tool. For example, in the case of a lathe, the motion mechanism includes structures such as a bed, headstock, saddle, and tool rest, X-axis and Z-axis feed mechanisms comprising ball screws, ball nuts, and feed motors, a spindle motor, and peripheral devices such as a tool changer. In the case of a machining center, the motion mechanism includes structures such as a bed, table, spindle head, and column, X-axis, Y-axis, and Z-axis feed mechanisms, a spindle motor, and peripheral devices such as a tool changer and a pallet changer.

The CNC command inputting section 10 is a processing section that generates operation command signals for the motion mechanism 2 by sequentially analyzing an NC program, and transmits the generated operation command signals to the CNC controlling section 11. The generated operation command signals are also transmitted to the model analyzing section 13.

The CNC controlling section 11 is a processing section that generates drive command signals by processing the operation command signals received from the CNC command inputting section 10, and that transmits the thus generated drive command signals to the feed motor and spindle motor of the motion mechanism 2. Work is machined while controlling the feed motor and spindle motor by the thus generated and transmitted drive command signals.

Figure 3:
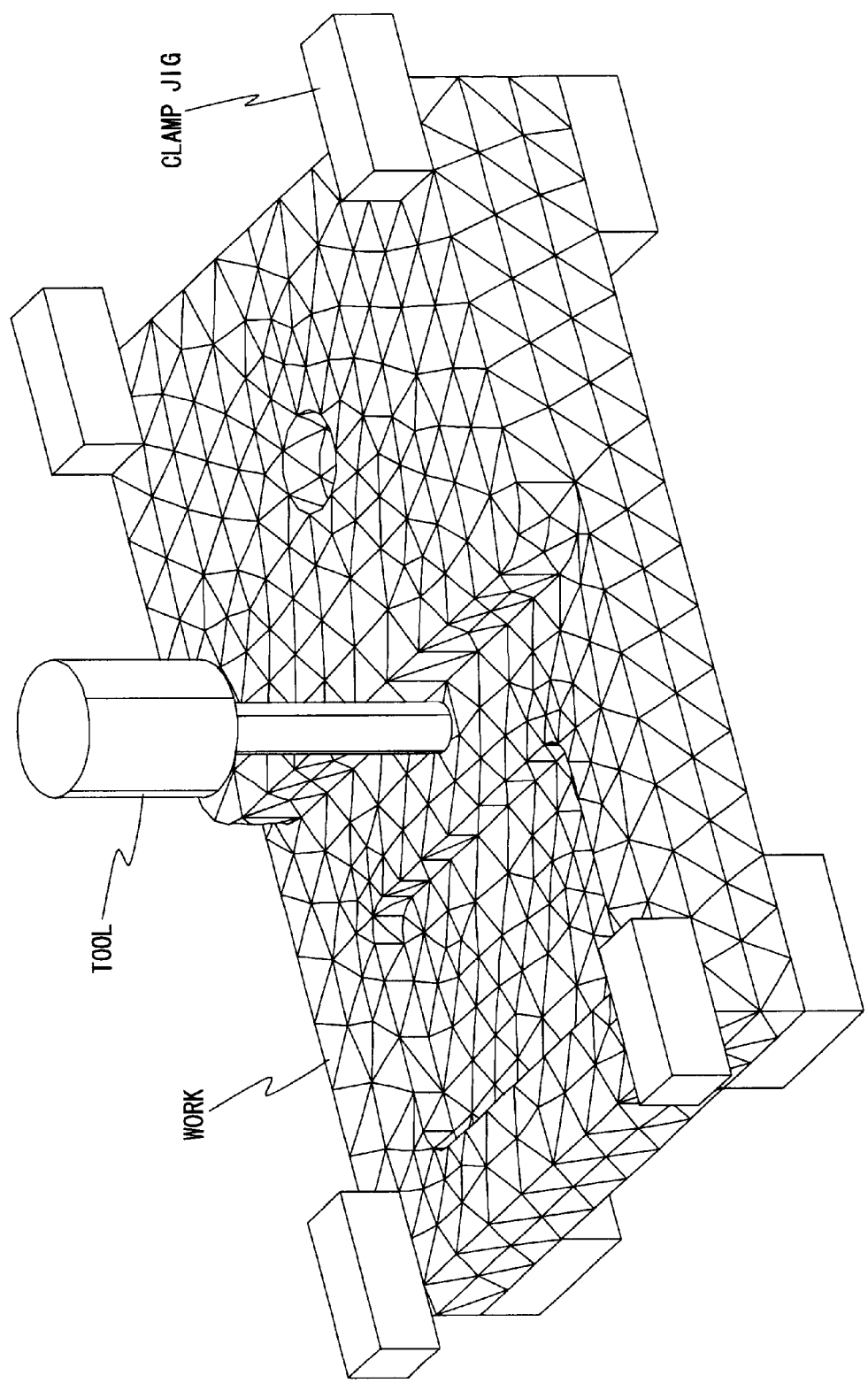
FIG. 3 is a perspective view showing three dimensional model data of a tool and work according to the embodiment.

Three dimensional model data of the motion mechanism 2, such as shown in FIG. 2, and three dimensional model data of the tool and the work, such as shown in FIG. 3, are prestored in the model analyzing data base 12, together with various condition data for performance analysis.

The three dimensional model data shown in FIG. 2 relates to a horizontal machining center comprising a bed, column, table, spindle head, spindle, and feed mechanisms (X-axis, Y-axis, and Z-axis), and is generated by suitably dividing three dimensional shape data, input using a three dimensional CAD system such as CATIA or UNIGRAPHICS, into fine elements and by translating them into the model data necessary for analysis; the three dimensional model data of the tool and the work are also generated in like manner.

The condition data comprises physical properties intrinsic to the materials forming the motion mechanism 2, tool, and work, such as thermal conductivity, linear expansion coefficient, Young's modulus, Poisson's ratio, and specific gravity, and the coefficient of heat transfer between each of the materials and the atmosphere.

The model analyzing section 13 analyzes the performance of the motion mechanism 2, such as deformation due to thermal load or machining load or vibrations caused by machining, based on the operation command signal received from the CNC command inputting section 10, the detected temperature data detected by the detecting section 4, and the three dimensional model data and condition data stored in the model analyzing data base 12. A technique such as a finite element method or boundary element method is used as the technique for analysis.

For example, when analyzing deformation due to thermal load, the amount of heat generated by heat generating sources, such as the feed motor and ball nut of the feed mechanism, the spindle motor, and the bearing, is computed based on the operation command signals for the spindle motor and the feed motor (signals relating to rotational speed) received from the CNC command inputting section 10 and, using the above analysis technique, the temperature distribution for each element is computed based on the amount of generated heat thus computed and on the three dimensional model data of the motion mechanism 2 and the condition data stored in the model analyzing data base 12. Then, based on the thus computed temperature distribution, the amount of thermal deformation is computed for each element, from which the amount of thermal deformation is computed for each part such as the spindle, the ball screws in the X-axis, Y-axis, and Z-axis feed mechanisms, the bed, the column, the table, the spindle head, etc.

On the other hand, when analyzing deformation due to machining load, cutting load (machining load) due to work machining is computed, based on the operation command signals for the spindle motor and the feed motor (signals relating to spindle rotational speed, feed speed, or electric current value of each motor and signals relating to the tool used) received from the CNC command inputting section 10 and on the three dimensional model data of the tool used and the work and the condition data stored in the model analyzing data base 12; then, based on the thus computed cutting load and on the three dimensional model data of the motion mechanism 2, the three dimensional model data of the tool used and the work, and the condition data stored in the model analyzing data base 12, the amount of deformation for each element is computed by using the above analysis technique and, from the amount of deformation thus computed, the amount of deformation is computed for each part such as the spindle, bed, column, table, spindle head, work, tool, etc.

Further, when analyzing the vibrations caused by machining, first the natural frequency of the motion mechanism 2 is computed by using the above analysis technique, based on the three dimensional model data of the motion mechanism 2 and the condition data stored in the model analyzing data base 12. Then, the frequency due to machining is computed as necessary, base on the operation command signals for the spindle motor and the feed motor (signals relating to spindle rotational speed, feed speed, or electric current value of each motor and signals relating to the tool used) received from the CNC command inputting section 10 and on the three dimensional model data of the motion mechanism 2, the three dimensional model data of the tool used and the work, the condition data, etc. stored in the model analyzing data base 12.

Method of computing the frequency f caused by machining is not specifically limited, but in the case of machining by a milling cutter or end mill, for example, the frequency f can be computed in a simple way by the following equation.

$$f = \text{(Spindle rotational speed (rotations/second)} \times \text{Number of teeth of tool)}$$

When turning an irregularly shaped work, interrupted cutting may be occurred, in which case the frequency of machining depends on the feed speed of the tool.

Performance analysis data analyzed by the model analyzing section 13 is stored in the data accumulating section 14. FIG. 4 shows one example of the stored data. The example of FIG. 4 shows the performance data concerning the amount of thermal deformation of each part of the motion mechanism 2, the amount of deformation thereof due to machining load, the amount of deformation of work due to machining load, the natural frequency of the motion mechanism 2, and the frequency caused by machining. Here, the data concerning the amount of thermal deformation, the amount of deformation due to machining load, and the frequency caused by machining are appropriately updated each time their corresponding values are computed by the model analyzing section 13.

The offset amount computing section 15, based on the performance analysis data stored in the data accumulating section 14, computes the amount of offset to be applied to the commanded operation amount output from the CNC command inputting section 10.

For example, when offsetting for the deformation of the motion mechanism 2 due to thermal load and machining load, the amount of displacement in the relative positional relationship between the tool and work is computed for each of the X-axis, Y-axis, and Z-axis on the basis of the deformation amounts, due to thermal load and machining load, of the spindle, bed, column, table, and spindle head stored in the data accumulating section 14, and the positioning error is computed for each of the X-axis, Y-axis, and Z-axis on the basis of the amount of thermal deformation of the ball screw; then, the amount of offset for each feed mechanism is computed based on the amount of displacement and the positioning error thus computed.

On the other hand, when making an offset based on the vibration of the motion mechanism 2, the frequency of machining is compared with the natural frequency of the motion mechanism 2 stored in the data accumulating section 14, and if the frequency of machining is within a predetermined range relative to the natural frequency, the amount of offset (the amount of decrease or increase in speed) to be applied to the feed speed of each feed mechanism and/or the rotational speed of the spindle is computed.

If the frequency due to machining is close to the natural frequency of the motion mechanism 2, resonance occurs in the motion mechanism 2, causing chatter on the machined surface and degrading machining accuracy. Accordingly, to achieve high accuracy machining, it is preferable that both the frequency of machining and the natural frequency of the motion mechanism 2 be analyzed and the rotational speed and/or feed speed of the tool and work be offset so as to prevent the above frequencies from coming close to each other. Therefore, as described above, if the frequency of machining is within a predetermined range relative to the natural frequency, the amount of offset is computed for decreasing or increasing the feed speed of each feed mechanism and/or the rotational speed of the spindle.

This amount of offset can be computed, for example, by multiplying the commanded feed speed currently given to the feed mechanism and/or the commanded rotational speed currently given to the spindle by a predetermined constant.

The amount of offset computed by the offset amount computing section 15 as described above is stored in the offset amount storing section 16. Then, the offset executing section 17 transmits the amount of offset stored in the offset amount storing section 16 to the CNC controlling section 11, and the CNC controlling section 11 offsets the operation command signal in accordance with the amount of offset thus received.

In this way, according to the offset apparatus 1 of this embodiment having the above-described configuration, the model analyzing section 13 analyzes the performance of the motion mechanism 2 such as the deformations due to thermal load and machining load and the vibrations caused by machining, based on the operation command signal transmitted from the CNC command inputting section 10, the detected temperature data detected by the detecting section 4, and the three dimensional model data, condition data, etc. stored in the model analyzing data base 12, and the analyzed performance data is stored in the data accumulating section 14.

Then, the offset amount computing section 15 reads out the performance analysis data (deformations due to thermal load and machining load, vibrations caused by machining, etc.) stored in the data accumulating section 14, and computes the amount of offset to be applied to the commanded operation amount output from the CNC command inputting section 10, and the amount of offset thus computed is stored in the offset amount storing section 16. The offset executing section 17 reads out the amount of offset stored in the offset amount storing section 16, and transmits it to the CNC controlling section 11, and the CNC controlling section 11 offsets the operation command signal in accordance with the amount of offset thus received.

In this way, according to the above offset apparatus 1, since the deformation of the entire motion mechanism 2 caused by thermal load, machining load, etc. is analyzed, and the amount of operation of each feed mechanism is offset based on the amount of deformation thus analyzed, accurate offset can be applied for the deformation compared with the prior art. Such accurate offset contributes to further enhancing the accuracy of machining.

Furthermore, since the motion mechanism 2 can be prevented from resonating by offsetting the feed speed of each feed mechanism and/or the rotational speed of the spindle so that machining vibrations will not induce resonance in the motion mechanism 2, chattering vibrations can be prevented from occurring in the machining process, and the surface accuracy of machined surfaces can thus be enhanced.

The present invention has been described above with reference to one embodiment, but it will be appreciated that the specific modes that can carry out the present invention are by no means limited to the above specific embodiment.

For example, in the above embodiment, deformations due to thermal load and machining load and vibrations caused by machining have been shown as examples of the performance of the motion mechanism 2, and the offset has been made in accordance with the performance, but the performance factors that can be analyzed and offset are not limited to the above-enumerated ones; for example, since the motion mechanism 2 also suffers deformation according to the moving position of a movable body such as the table, saddle, or column, provisions may also be made to analyze such deformation and apply an appropriate offset.

What is claimed is:

1. An NC machine tool offset apparatus which is provided for an NC machine tool equipped with a numerical controller for controlling operation of a motion mechanism in accordance with an operation command signal, and which offsets the amount of operation of said motion mechanism which is driven and controlled in accordance with said operation command signal, comprising:

analysis data storing means for storing three dimensional model data of said motion mechanism and condition data for performance analysis;

analyzing means for analyzing the performance of said motion mechanism, based on said operation command signal in said numerical controller and on the three dimensional model data of said motion mechanism and the condition data for performance analysis stored in said analysis data storing means;

data accumulating means for storing performance analysis data analyzed by said analyzing means;

offset amount computing means for computing, from the performance analysis data stored in said data accumulating means, the amount of offset to be applied to a commanded operation amount directed by said operation command signal; and offset executing means for offsetting the amount of operation of said motion mechanism, based on the amount of offset computed by said offset amount computing means.

2. An NC machine tool offset apparatus according to claim 1, wherein said analyzing means is provided so as to analyze deformation of said motion mechanism due to load, and said offset amount computing means is provided so as to compute said amount of offset appropriate to the amount of said analyzed deformation, based on the result of the analysis done by said analyzing means.

3. An NC machine tool offset apparatus according to claim 1, wherein said analyzing means is provided so as to analyze vibration of said motion mechanism, and said offset amount computing means is provided so as to compute said amount of offset for at least one of feed speed and rotational speed of said motion mechanism, based on the result of the analysis done by said analyzing means.

* * * * *